(12) United States Patent  (10) Patent No.: US 9,058,228 B2
Sackett  (45) Date of Patent: Jun. 16, 2015

(54) RANDOM NUMBER GENERATOR FOR GENERATING TRULY RANDOM NUMBERS

(71) Applicant: Raytheon Company, Waltham, MA (US)

(72) Inventor: James R. Sackett, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 284 days.

(21) Appl. No.: 13/770,876

(22) Filed: Feb. 19, 2013

(65) Prior Publication Data

US 2014/0237011 A1  Aug. 21, 2014

(51) Int. Cl.
*G06F 7/58* (2006.01)

(52) U.S. Cl.
CPC ............... *G06F 7/582* (2013.01); *G06F 7/588* (2013.01)

(58) Field of Classification Search
CPC ........... G06F 7/588; G06F 17/10; G06F 7/58; H03K 3/84; B82Y 10/00
USPC ........................................................ 708/255
See application file for complete search history.

(56) References Cited

U.S. PATENT DOCUMENTS 5,963,104 A * 10/1999 Buer .............................. 708/250
6,714,955 B2   3/2004 Le Quere
7,389,316 B1   6/2008 Baetoniu
2005/0055391 A1 * 3/2005 Carlson et al. ................ 708/250
2006/0069706 A1 * 3/2006 Lazich et al. ................. 708/251
2010/0281088 A1   11/2010 Wilber
2011/0128081 A1   6/2011 Hars

OTHER PUBLICATIONS

Andrew Rukhin, et al., "A Statistical Test Suite for Random and Pseudorandom Number Generators for Cryptographic Applications", NIST, Apr. 2010, 115 pages.

* cited by examiner

*Primary Examiner* — Tan V. Mai (57) ABSTRACT

An apparatus includes multiple oscillators, where each oscillator includes an inverter chain. The apparatus also includes combinatorial logic configured to generate a random number having one or more bits. The combinatorial logic is configured to generate each bit by combining two or more signals from at least two oscillators that have inverter chains with different prime numbers of inverters. The combinatorial logic may be configured to generate each bit using signals from a unique combination of oscillators. The combinatorial logic may also be configured to combine the signals asynchronously and sample the combined signal synchronously using a synchronous sampling clock, where at least one of the signals is not harmonically related to the sampling clock. Each of at least one of the oscillators may include multiple taps configured to provide multiple signals, and the multiple signals from one oscillator could have different asynchronous phases relative to the sampling clock.

23 Claims, 5 Drawing Sheets

RANDOM NUMBER GENERATOR FOR GENERATING TRULY RANDOM NUMBERS

TECHNICAL FIELD

This disclosure is generally directed to random number generation. More specifically, this disclosure relates to a random number generator for generating truly random numbers.

BACKGROUND

The generation of random numbers is typically an important function in many different applications, such as data encryption and computer simulation. Conventional devices that attempt to generate random numbers often use an entropy generator derived from a natural process, followed by a "whitener" that improves the apparent randomness and the output rate of the generated numbers.

Entropy generators often use complex sensors to measure physical processes like radioactive decay, shot noise, thermal noise, avalanche noise, or radio noise. Unfortunately, entropy generators like this typically occupy a relatively large amount of space and generate random numbers at a very low rate. This often makes them unsuitable for use in applications that require the generation of high-quality truly random numbers at a high rate within a limited physical space. Moreover, entropy generators like this are often exposed, meaning they are subject to external monitoring. Some applications (such as cryptographic applications) may require physical security of the devices generating random numbers, which typically prohibits the use of these types of entropy generators.

Whiteners typically use hash functions, linear hybrid cellular automatons, or pseudo-random number sequencers to increase the number generation rate and to increase the appearance of randomness in the generated numbers. However, even with the use of whiteners, it cannot be guaranteed that generated numbers are truly random and lack an inherent pattern.

SUMMARY

This disclosure provides a random number generator for generating truly random numbers.

In a first embodiment, an apparatus includes multiple oscillators, where each oscillator includes an inverter chain. The apparatus also includes combinatorial logic configured to generate a random number having one or more bits. The combinatorial logic is configured to generate each bit by combining two or more signals from at least two oscillators that have inverter chains with different prime numbers of inverters.

In a second embodiment, a system includes a random number generator having multiple oscillators and combinatorial logic. Each oscillator includes an inverter chain. The combinatorial logic is configured to generate a random number having one or more bits. The combinatorial logic is configured to generate each bit by combining two or more signals from at least two oscillators that have inverter chains with different prime numbers of inverters. The system also includes a processing device configured to receive the random number.

In a third embodiment, a method includes receiving multiple signals from multiple oscillators, where each oscillator includes an inverter chain. The method also includes generating a random number having one or more bits. Each bit of the random number is generated by combining two or more signals from at least two oscillators that have inverter chains with different prime numbers of inverters.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 2 through 5 illustrate example components and related details of a random number generator for generating truly random numbers in accordance with this disclosure.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
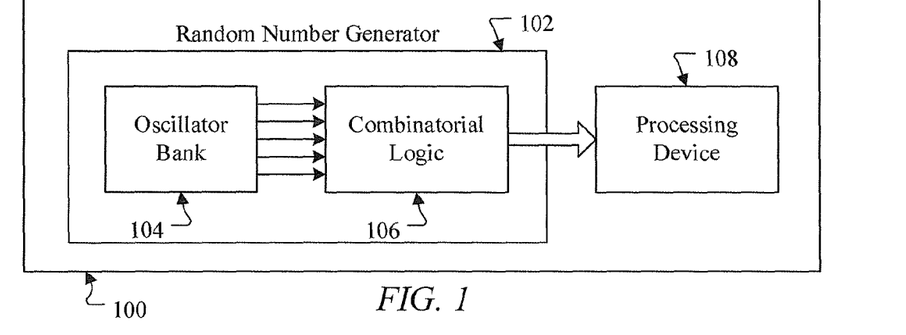
FIG. 1 illustrates an example system for generating and using truly random numbers in accordance with this disclosure.

FIG. 1 illustrates an example system 100 for generating and using truly random numbers in accordance with this disclosure. As shown in FIG. 1, the system 100 includes a random number generator 102. The random number generator 102 is configured to generate numbers that are truly random, meaning the numbers lack both explicit and inherent patterns. In this example, the random number generator 102 includes an oscillator bank 104 and combinatorial logic 106.

As described in more detail below, the oscillator bank 104 includes multiple ring oscillators, where each of those ring oscillators is formed using an inverter chain having a prime number of inverters. Moreover, at least two of these ring oscillators have different lengths, meaning the inverter chains in those ring oscillators are formed using different prime numbers of inverters.

The outputs from at least two ring oscillators having different prime lengths are combined using the combinatorial logic 106 in order to generate one or more truly random numbers. The combinatorial logic 106 operates to heterodyne or combine multiple outputs from those ring oscillators asynchronously. The resulting value(s) can then be sampled using a synchronous sampling clock to generate one or more bit results. The bit results (either individually or collectively) represent one or more truly random numbers. Each random number could include a single bit result, multiple bit results generated serially, or multiple bit results generated in parallel. In some embodiments, the combinatorial logic 106 generates each bit result using signals from a unique combination of oscillators.

The operations of the ring oscillators vary based on a number of factors, including temperature and noise. As a result, the frequencies of the ring oscillators are affected (among other things) by their thermal and noise environments, natural inputs that create entropy. Because of this, the bit results generated by the combinatorial logic 106 using signals from those ring oscillators are random in nature.

Moreover, the use of ring oscillators having different prime lengths helps to ensure that the outputs of those ring oscillators are not harmonically related to one another. Harmonic relationships can lead to inherent patterns in allegedly random numbers. Since the outputs from two ring oscillators of different prime lengths are not harmonically related to each other, it is not possible for the outputs from those two ring oscillators to both be harmonically related to the synchronous sampling clock used by the combinatorial logic 106. This helps to ensure that the synchronous sampling operations performed by the combinatorial logic 106 generate entropy, rather than an aliased harmonic sample of an ordered signal.

In addition, each ring oscillator could contain multiple taps that provide multiple outputs from the same ring oscillator. While frequency locked, the individual taps from the same oscillator contain different phase relationships and therefore unique temporal behaviors when sampled asynchronously. The use of multiple taps in a ring oscillator can therefore reduce the overall number of ring oscillators needed in the random number generator 102. However, the use of taps in a ring oscillator is optional, and a ring oscillator could provide a single output signal. Depending on the implementation, the use of taps might be more economical as fewer ring oscillators may be needed, while separate ring oscillators can provide more opportunities for entropy.

The oscillator bank 104 includes multiple ring oscillators, and any number of ring oscillators (greater than or equal to two) could be used. Note that not all of the ring oscillators need to have inverter chains of different prime lengths, as long as at least two ring oscillators have inverter chains of different prime lengths. For instance, two of the ring oscillators could have inverter chains of the same prime length, and the combinatorial logic 106 can be configured to process the outputs from the ring oscillators so that neither two outputs from a common oscillator nor two outputs from equal-length oscillators are used in the generation of a single bit result. Different bit results can be generated using different outputs from a common oscillator, and different bit results can be generated using outputs from different equal-length oscillators. This can help ensure the truly random nature of the generated bit results. The combinatorial logic 106 includes any suitable logic components or other components for combining multiple signals from an oscillator bank to generate one or more random bit results.

Figure 2:
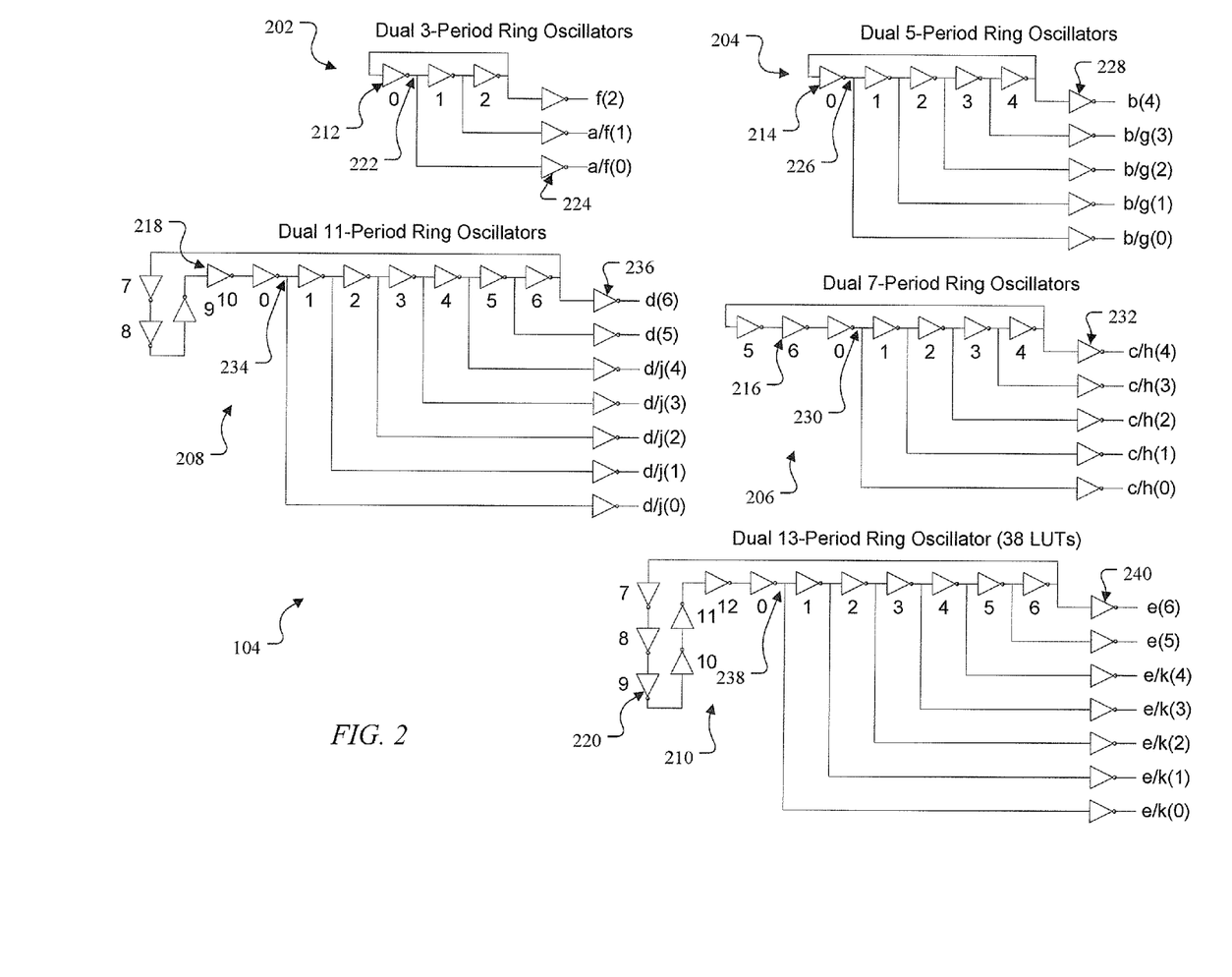
Figure 3A:
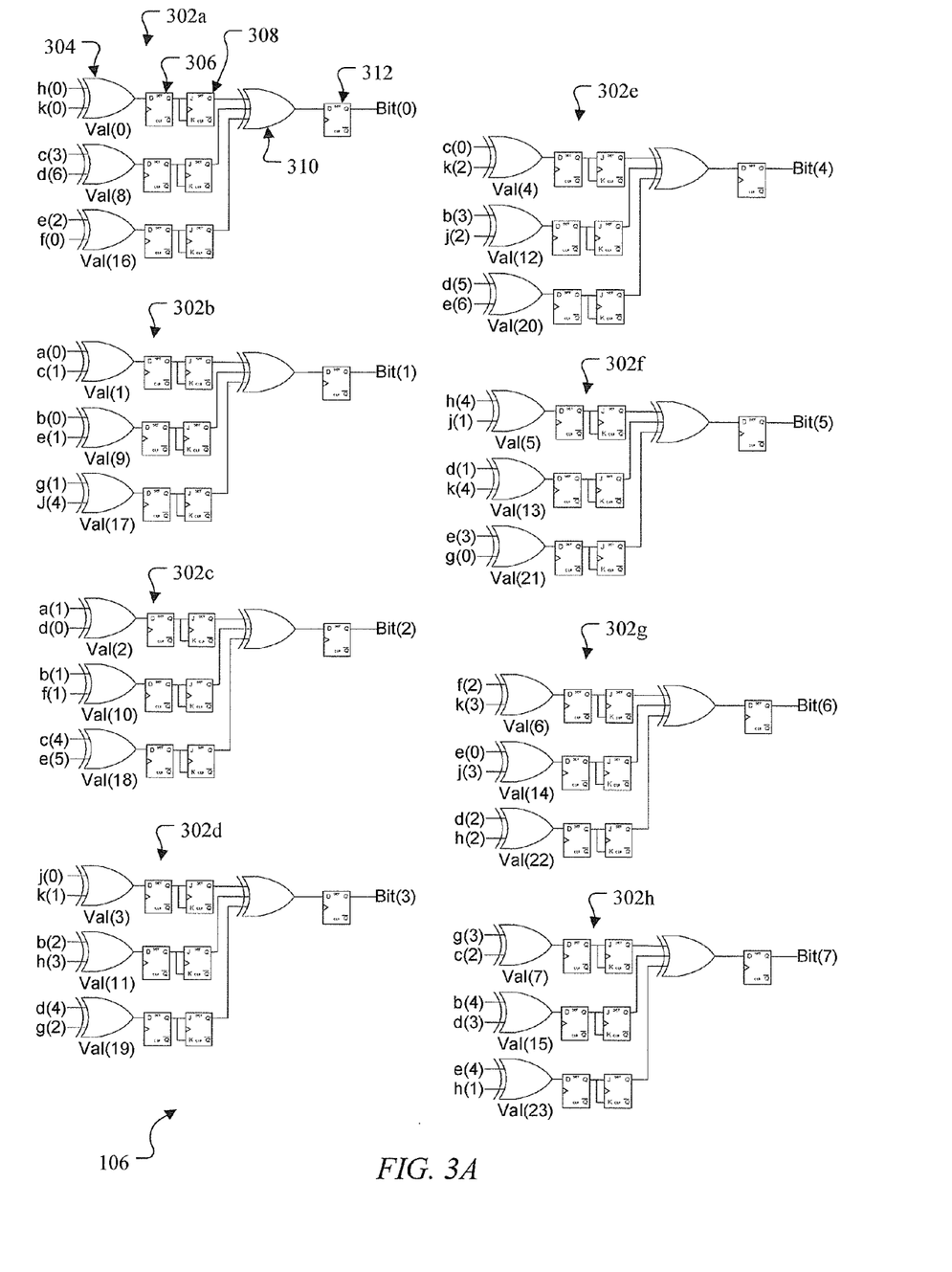
Figure 3B:
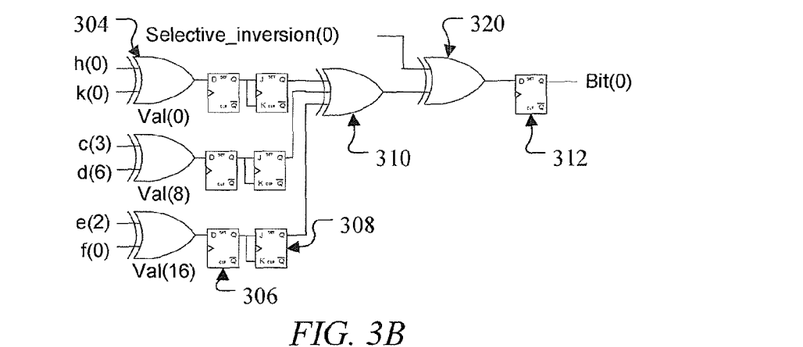
Figure 3C:
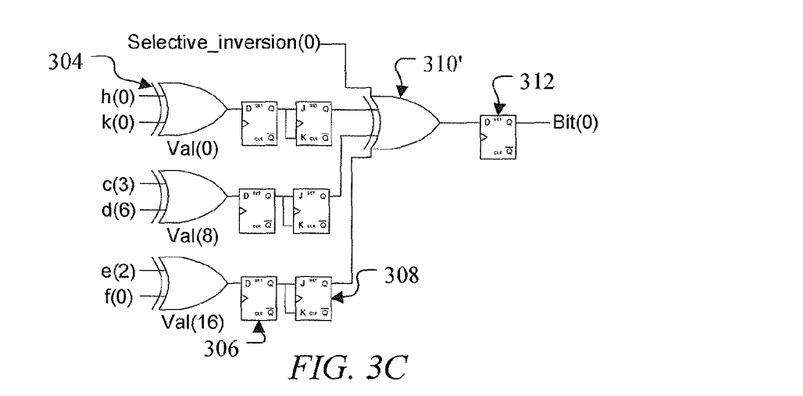
Figure 4:
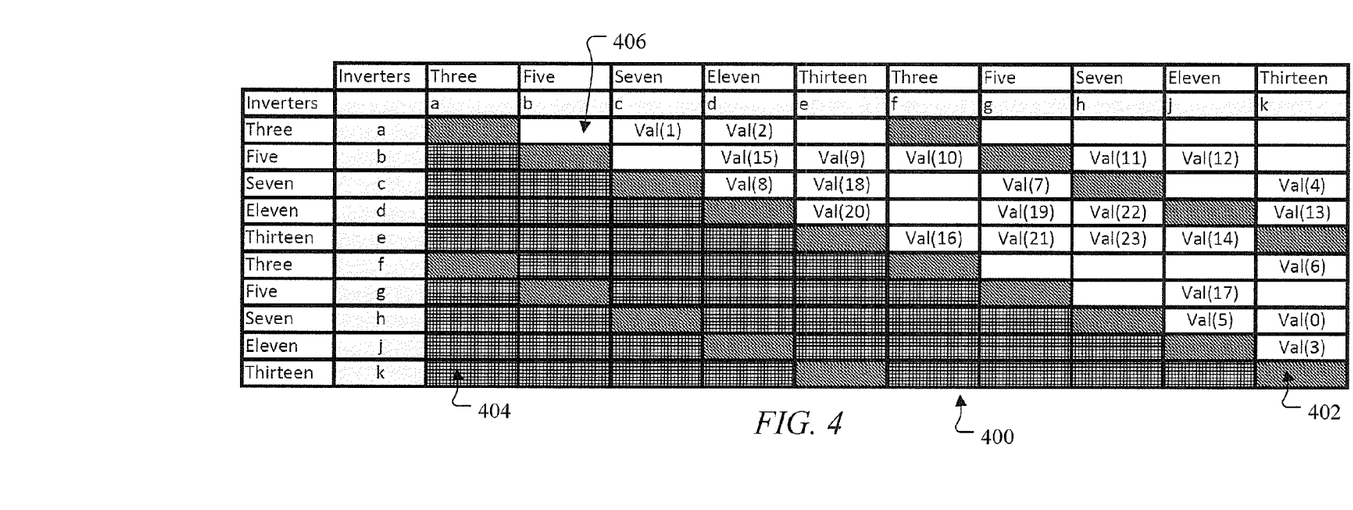
Figure 5:
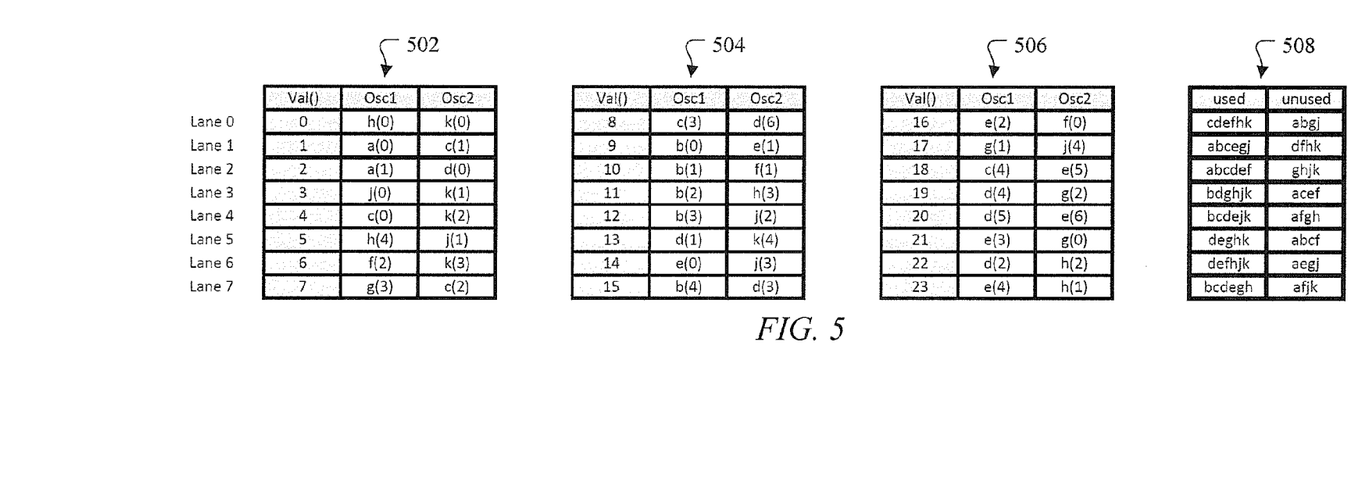

One example embodiment of the oscillator bank 104 is shown in FIG. 2. Example embodiments of the combinatorial logic 106 are shown in FIGS. 3A through 3C. Details related to an example assignment of ring oscillators and oscillator taps to the generation of different bit results are shown in FIGS. 4 and 5.

The random number generator 102 in this example provides one or more random numbers to at least one processing device 108. The processing device 108 can use the one or more random numbers for any suitable purpose(s). For example, one or more random numbers could be used in military or commercial cryptographic applications, such as in the generation of public/private keys or symmetrical (shared) keys used to secure sensitive data like military information, secure data transfers, financial information, or other data. One or more random numbers could also be used in military or commercial computer simulations, such as those involving digital random noise sources or Monte Carlo simulations. One or more random numbers could further be used in military or commercial completely randomized design applications, as a basis for random chance in gaming (like gambling), and as a random input for statistical sampling. These applications are examples only, and the random number generator 102 could be used in any other or additional applications as desired.

In some embodiments, the random number generator 102 provides a large number of truly random numbers at a high rate. In particular implementations, the random number generator 102 could output truly random numbers at speeds of one or more megabits per second, although even faster speeds could be obtained depending on the implementation. This high generation rate can help to avoid the common alternative practice of seeding pseudo-random generators whose outputs are not actually random.

Moreover, in some embodiments, the random number generator 102 is implemented as a single small device, such as a single field programmable gate array (FPGA), single application specific integrated circuit (ASIC), or other single integrated circuit device. This single device may or may not include or be co-located with the component(s) that use the number(s) generated by the random number generator 102, such as the processing device 108. The single device may also include one or multiple sources of entropy, such as temperature and various types of noise. As a result, the random number generator 102 can be provided and used in a highly secure manner, and it can typically be provided in a smaller and cheaper package. In addition, the random number generator 102 can operate without a whitener or similar device while still satisfying stringent requirements for randomness. In particular embodiments, the random number generator 102 without a whitener is able to pass the tests for randomness defined in the U.S. National Institute of Standards and Technology (NIST) Special Publication 800-22 Revision 1a entitled "A Statistical Test Suite for Random and Pseudorandom Number Generators for Cryptographic Applications" with a 99% confidence level. An even better confidence value could be obtained by adding a whitener to the random number generator 102.

Although FIG. 1 illustrates one example of a system 100 for generating and using truly random numbers, various changes may be made to FIG. 1. For example, the random number generator 102 could be used with any other suitable device(s) or system(s) and is not limited to use with a processing device 108. Also, the functional division shown in FIG. 1 is for illustration only. Various components in FIG. 1 could be combined or further subdivided and additional components could be added according to particular needs.

FIGS. 2 through 5 illustrate example components and related details of a random number generator 102 for generating truly random numbers in accordance with this disclosure. FIG. 2 illustrates one specific example implementation of the oscillator bank 104. In the example shown in FIG. 2, the oscillator bank 104 includes ten ring oscillators 202-210. Each of these ring oscillators 202-210 is formed from an inverter chain having a prime number of inverters, namely:

two ring oscillators 202 each have an inverter chain formed from three inverters 212;
two ring oscillators 204 each have an inverter chain formed from five inverters 214;
two ring oscillators 206 each have an inverter chain formed from seven inverters 216;
two ring oscillators 208 each have an inverter chain formed from eleven inverters 218; and
two ring oscillators 210 each have an inverter chain formed from thirteen inverters 220.

In some embodiments, the length of the shortest inverter chain(s) is selected to provide the highest practical frequency for a particular device or system, such as around one gigahertz (although this could be higher or lower). Moreover, the oscillator bank 104 can be arranged so that ring oscillators of the same length are physically separated from one another. For instance, two ring oscillators of the same length could be physically separated by a ring oscillator of a different length. The physical separation of ring oscillators having an equal length means that those ring oscillators likely operate at different temperatures (even if the temperature difference is slight), which helps to increase the entropy of the random number generator 102.

Each of the ring oscillators 202-210 also has multiple taps, which provide signals from different points within the ring oscillators' inverter chains. The taps in the same ring oscillator provide different asynchronous phases relative to the synchronous sampling clock used by the combinatorial logic 106. This allows one ring oscillator to serve as if it were several unique oscillators.

In this example, each ring oscillator 202 includes two or three taps 222, each of which is coupled to an inverter 224. One ring oscillator 202 includes two taps 222 coupled to two inverters 224 that generate values a(0) and a(1). Another ring oscillator 202 includes three taps 222 coupled to three inverters 224 that generate values f(0)-f(2).

Each ring oscillator 204 includes four or five taps 226, each of which is coupled to an inverter 228. One ring oscillator 204 includes five taps 226 coupled to five inverters 228 that generate values b(0)-b(4). Another ring oscillator 204 includes four taps 226 coupled to four inverters 228 that generate values g(0)-g(3).

Each ring oscillator 206 includes five taps 230, each of which is coupled to an inverter 232. One ring oscillator 206 includes five taps 230 coupled to five inverters 232 that generate values c(0)-c(4). Another ring oscillator 206 includes five taps 230 coupled to five inverters 232 that generate values h(0)-h(4).

Each ring oscillator 208 includes five or seven taps 234, each of which is coupled to an inverter 236. One ring oscillator 208 includes seven taps 234 coupled to seven inverters 236 that generate values d(0)-d(6). Another ring oscillator 208 includes five taps 234 coupled to five inverters 236 that generate values j(0)-j(4).

Each ring oscillator 210 includes five or seven taps 238, each of which is coupled to an inverter 240. One ring oscillator 210 includes seven taps 238 coupled to seven inverters 240 that generate values e(0)-e(6). Another ring oscillator 210 includes five taps 238 coupled to five inverters 240 that generate values k(0)-k(4).

FIGS. 3A through 3C illustrate specific example implementations of the combinatorial logic 106. In particular, FIGS. 3A through 3C illustrate specific examples of the combinatorial logic 106 that can be used to process the various values generated by the oscillator bank 104 shown in FIG. 2. The combinatorial logic 106 generally operates to heterodyne or mix pairs or other subsets of unique asynchronous ring oscillator outputs, and the resulting values are sampled using a synchronous sampling clock to generate single-bit results.

In the example shown in FIG. 3A, the combinatorial logic 106 includes multiple bit lanes 302a-302h. Each bit lane 302a-302h receives values from multiple taps in the oscillator bank 104 of FIG. 2. The bit lanes 302a-302h process those values to generate multiple bit results Bit(0)-Bit(7), which collectively form one or more random numbers. While each of eight bit lanes 302a-302h here receives signals from six taps, the combinatorial logic 106 could include any number of bit lanes, and each bit lane could receive signals from two or more taps.

Each bit lane 302a-302h here includes three logic XOR gates 304, three digital registers 306, three toggle-type flip-flops 308, an additional logic XOR gate 310, and an additional digital register 312. Each digital register 306 is coupled to the output of one XOR gate 304, and each toggle-type flip-flop 308 is coupled to the output of one digital register 306. Each XOR gate 310 is coupled to the outputs of three toggle-type flip-flops 308. Each digital register 312 is coupled to the output of one XOR gate 310. Here, the digital registers 306, the toggle-type flip-flops 308, and the digital registers 312 in all bit lanes can operate using the same synchronous sampling clock.

Each signal from a tap in the oscillator bank 104 has some entropy, and this entropy can be increased by combining signals from multiple unrelated taps in the oscillator bank 104. This is accomplished using the XOR gates 304 in the bit lanes 302a-302h, where each XOR gate 304 performs a logical XOR operation using signals from two taps in the oscillator bank 104 of FIG. 2. However, to help increase or maximize entropy, a signal from a tap is provided to no more than one XOR gate 304 in all of the bit lanes, and each XOR gate 304 receives signals from taps in ring oscillators of different prime lengths. As a result, even if one input to an XOR gate 304 is harmonically related to the synchronous sampling clock, both inputs to that XOR gate 304 are not harmonically related to the synchronous clock due to the difference in prime lengths. Because of this, increased entropy is produced for the single-bit output from each XOR gate 304.

The outputs from the XOR gates 304 are provided as inputs to the digital registers 306, which temporarily latch the outputs of the XOR gates 304. The digital registers 306 can be implemented as D flip-flops. Asynchronous sampling can occasionally violate setup and hold requirements of a digital register 306, resulting in a metastable condition within the digital register 306. This condition results in an eventual random choice of output at one or zero, inserting more entropy. However, some devices may have a preference to settle metastable conditions at one or zero, decreasing this extra entropy. To help compensate for this, the outputs of the digital registers 306 are provided as inputs to the toggle-type flip-flops 308, each of which toggles an output data bit, to balance the quantities of ones and zeros that can result from unbalanced metastable settling. Effectively, the unbalance of ones and zeros is traded for an unbalance of toggle/no toggle states. In this example, the toggle-type flip-flops 308 are implemented as JK flip-flops, each with its J and K inputs tied together.

In this arrangement, the output of each XOR gate 304 in each bit lane 302a-302h is used to toggle a flip-flop 308 in the synchronous domain, which results in a balanced stream of ones and zeros. This is something that is difficult to obtain in conventional ring oscillators due to differences in rise and fall times and metastable settling bias of a sampling flip-flop.

The outputs of the toggle-type flip-flops 308 are provided to the XOR gates 310 in the bit lanes 302a-302h. The XOR gate 310 in each bit lane 302a-302h performs a logical XOR operation using its inputs and generates an output. The additional digital register 312 latches the output from the XOR gate 310. The digital registers 312 can be implemented as D flip-flops. The final bit results Bit(0)-Bit(7) from the bit lanes 302a-302h contain all of the entropy of the initial inputs received by those bit lanes.

As can be seen in FIG. 3A, each bit lane 302a-302h generates a single bit result Bit(0)-Bit(7), respectively, using signals from six taps in the oscillator bank 104 of FIG. 2. However, the six taps associated with each bit lane come from different ring oscillators. Also, because of the difference in prime number lengths of the ring oscillators, no more than two of the six tap signals coming into each bit lane might be harmonically related to the synchronous sampling clock's frequency. At least four remaining inputs are not harmonically related to the synchronous sampling clock's frequency.

Since some asynchronous settling may have one or zero bias (which changes), another balanced selective inversion could be applied to each output bit individually. Examples of this are shown in FIGS. 3B and 3C. As shown in FIG. 3B, each bit lane could include an additional XOR gate 320 inserted between the XOR gate 310 and the digital register 312. The XOR gate 320 performs a logical XOR operation using the output of the XOR gate 310 and a selective inversion input. The digital register 312 then latches the output of the XOR gate 320. Another way to implement selective inversion is shown in FIG. 3C, where the XOR gate 310 is replaced by an XOR gate 310' that can receive the selective inversion input along with the outputs from the toggle-type flip-flops 308. The use of selective inversion is optional and could be implemented in none, one, some, or all of the bit lanes. The individual periods of the inversion can be managed along prime number relationships to prevent them from having any patterned influence, which results in a better overall balance of ones and zeros across operating environments. The selective inversion inputs to the bit lanes could be provided from any suitable source(s), such as mixed prime-length synchronous counters. Any suitable inversion patterns could be used here, such as patterns that are half-high, half-low and that are different for each bit lane.

As shown in FIGS. 2 and 3A, different taps of the same ring oscillator may be used in different bit lanes, but each tap is used only once (at most). As a result, while the final bit results Bit(0)-Bit(7) may share signals from the same ring oscillators for economy, the sharing is through different taps with unique phase relationships, which when asynchronously sampled create unrelated outputs of considerable entropy. As noted above, each bit lane can alternatively use signals from completely separate oscillators (of course, this requires enough space to have an adequate number of oscillators). In either case, the simultaneous generation of multiple bit results creates truly random values at high rates while maintaining an economically small footprint.

To increase the frequency of the random number generation, the ring oscillators in the oscillator bank 104 may be kept as short as possible, increasing their frequency of oscillation. As noted above, there may be more than one ring oscillator of the same length, although signals from two oscillators of the same length may not be provided to the same XOR gate 304. To prevent equal-length ring oscillators from phase locking, the equal-length oscillators can be placed in a circuit physically away from each other, such as with other-length oscillators placed between the equal-length oscillators. Because of their different prime lengths, this helps to prevent neighboring oscillators from phase locking with each other.

In FIG. 3A, the XOR gates 304 generate different output values denoted Val(0)-Val(23). These values represent initial bit values that contain some entropy, and the additional components in each bit lane 302a-302h operate to combine these initial bit values to generate bit results Bit(0)-Bit(7) having greater entropy. FIGS. 4 and 5 illustrate one example technique for assigning the taps of different oscillators in the oscillator bank 104 to the bit lanes 302a-302h in order to generate these initial bit values Val(0)-Val(23).

As shown in FIG. 4, a table 400 identifies the ten ring oscillators 202-210 of FIG. 2, denoting the oscillators with letters a-k along both axes. Because an XOR gate 304 should not receive inputs from two taps of the same ring oscillator or from two taps of different ring oscillators with the same length, the hatched entries 402 in the table 400 indicate which combinations of oscillators should not be used. Also, because using an x-length ring oscillator and a y-length ring oscillator is equivalent to using a y-length ring oscillator and an x-length ring oscillator, the cross-hatched entries 404 in the table 400 identify redundant combinations of oscillators. The remaining non-hatched entries 406 identify allowable combinations of ring oscillators that could be used to generate the initial bit values Val(0)-Val(23) in FIG. 3A. As shown in FIG. 4, the twenty-four initial bit values Val(0)-Val(23) have been assigned to various combinations of oscillators, although the actual taps of those oscillators are not identified.

FIG. 5 illustrates the assignment of actual taps from the ring oscillators to the initial bit values Val(0)-Val(23). In FIG. 5, three tables 502-506 are shown, where each table identifies one of the initial bit values Val(0)-Val(23) and the input signals from two of the ring oscillators used to generate that initial bit value. Here, the signals from the ring oscillators are expressed in the notation w(z), where w denotes the oscillator (letter a-k) and z denotes the tap. As can be seen here, each row across in the three tables 502-506 is associated with a different bit lane 302a-302h, where each lane generates three of the initial bit values Val(0)-Val(23). This matches the configuration shown in FIG. 3A. A table 508 here identifies all of the oscillators that are used and not used in each bit lane.

Although FIGS. 2 through 5 illustrate examples of components and related details of a random number generator 102 for generating truly random numbers, various changes may be made to FIGS. 2 through 5. With respect to FIG. 2, the prime numbers of inverters used in FIG. 2 are for illustration only. Inverter chains of other or additional length(s) could be used in the oscillator bank 104. Also, the use of two ring oscillators of equal length is for illustration only. Any number of oscillators could have inverter chains of the same length, as long as at least two ring oscillators have inverter chains of different prime lengths. In addition, the number of taps in each ring oscillator can vary depending on how signals from those oscillators are used by the combinatorial logic 106. In the example shown here, values a(2), g(4), j(5)-j(6), and k(5)-k(6) are not needed from their respective ring oscillators and are therefore not generated. However, any oscillator in the oscillator bank 104 could easily include more or fewer taps depending on the implementation. As described above, for example, one or more ring oscillators in the oscillator bank 104 could be designed to provide a single output signal.

With respect to FIGS. 3A through 3C, the combinatorial logic 106 could include any number of bit lanes. Also, each XOR gate 304 could combine more than two tap signals from the oscillator bank 104. Further, any other suitable logic could be used to process the outputs of the XOR gates 304. In addition, the combinatorial logic 106 shown in FIGS. 3A through 3C represents merely example ways that signals from different prime-length oscillators can be combined to form result bits. Other combinatorial logic 106 could also be used.

With respect to FIGS. 4 and 5, the assignments of oscillators and taps to initial bit values are for illustration only. Any other suitable assignments of oscillators and taps to initial bit values could be used. In some embodiments, the following three rules can be used in the assignment of oscillators and taps to initial bit values. First, an oscillator can supply one signal (at most) to each bit lane 302a-302h. Stated another way, an oscillator can provide a signal to only one of the XOR gates 304 in a bit lane (although the same oscillator could provide signals to XOR gates 304 in different bit lanes). Second, oscillators of the same prime length cannot supply signals for generating the same initial bit value. Stated another way, each XOR gate 304 receives signals from oscillators of different prime lengths. Third, each tap of an oscillator is used only once in generating the initial bit values. Stated another way, each tap of an oscillator provides its output to only one XOR gate 304 (at most).

Finally, in the figures described above, various components are shown as being implemented using hardware components such as XOR gates and flip-flops. However, various components could also be implemented using software/firmware executed by a hardware platform. For instance, signals from the oscillator bank 104 could be digitized, and the combinatorial logic 106 could be implemented using software/firmware that operates using the digital signals and that is executed by a hardware platform (such as the processing device 108).

Figure 6:
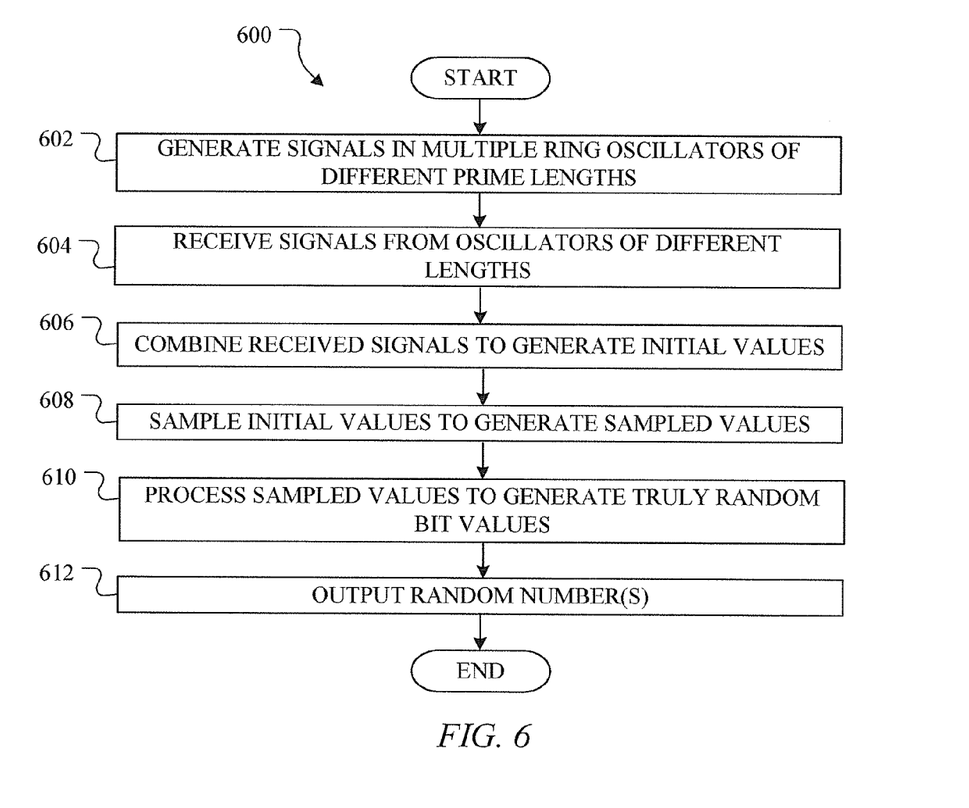
FIG. 6 illustrates an example method for generating truly random numbers in accordance with this disclosure.

FIG. 6 illustrates an example method 600 for generating truly random numbers in accordance with this disclosure. As shown in FIG. 6, signals are generated in multiple ring oscillators of different prime lengths at step 602. This could include, for example, generating signals in the different ring oscillators 202-210 of the oscillator bank 104. As noted above, multiple ring oscillators could have the same prime length, as long as at least two of the ring oscillators have different prime lengths.

Signals are received from oscillators of different prime lengths at step 604. This could include, for example, the combinatorial logic 106 receiving signals from different taps of the ring oscillators 202-210. The signals could be received in pairs or other subsets, such as in pairs of inputs for the XOR gates 304. Each pair of inputs includes signals from two ring oscillators 202-210 of different prime lengths.

The received signals are combined to generate initial values at step 606. This could include, for example, the XOR gates 304 operating on the received signals to generate the initial values Val(0)-Val(23). The initial values are sampled to generate sampled values at step 608. This could include, for example, the digital latches 306 synchronously sampling the outputs of the XOR gates 304 using a synchronous sampling clock. The sampled values are processed to generate truly random bit values at step 610. This could include, for example, using the toggle-type flip-flops 308 to generate balanced streams of ones and zeros based on the outputs of the digital latches 306. This could also include combining the balanced streams using the XOR gates 310 to generate bit values that are sampled by the digital registers 312.

One or more truly random numbers are output at step 612. This could include, for example, the digital registers 312 providing their sampled values to one or more external components, such as the processing device 108. Each random number could include one or multiple bits.

Although FIG. 6 illustrates one example of a method 600 for generating truly random numbers, various changes may be made to FIG. 6. For example, while shown as a series of steps, various steps in FIG. 6 could overlap, occur in parallel, or occur multiple times. Also, the processing performed in steps 608-610 is for illustration only. The initial values generated in step 606 could be used in any other suitable manner, which includes simply outputting the initial values as a random number or processing the initial values in a different way to generate a random number.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
multiple oscillators, each oscillator comprising an inverter chain; and
combinatorial logic configured to generate a random number comprising one or more bits, the combinatorial logic configured to generate each bit by combining two or more signals from at least two oscillators that have inverter chains with different prime numbers of inverters;
wherein, for each bit of the random number, the combinatorial logic is configured to generate multiple initial values, each initial value generated using signals from a different subset of oscillators.

2. The apparatus of claim 1, wherein the combinatorial logic is configured to generate each bit using signals from a unique combination of oscillators.

3. The apparatus of claim 1, wherein each subset of oscillators consists of oscillators with inverter chains having different numbers of inverters.

4. The apparatus of claim 1, wherein, for each bit of the random number, the combinatorial logic is further configured to:
sample the initial values to generate sampled values;
toggle multiple data bits using the sampled values; and
combine the multiple data bits.

5. The apparatus of claim 4, wherein, for each bit of the random number, the combinatorial logic is further configured to perform a selective inversion by performing one of:
a logical XOR operation using the combined data bits and a selective inversion input; and
a logical XOR operation using the multiple data bits and the selective inversion input.

6. The apparatus of claim 1, wherein the oscillators and the combinatorial logic reside in a single integrated circuit device.

7. An apparatus comprising:
multiple oscillators, each oscillator comprising an inverter chain; and
combinatorial logic configured to generate a random number comprising one or more bits, the combinatorial logic configured to generate each bit by combining two or more signals from at least two oscillators that have inverter chains with different prime numbers of inverters;
wherein:
the combinatorial logic is configured to combine the two or more signals asynchronously and sample the combined signal synchronously using a synchronous sampling clock; and
at least one of the two or more signals is not harmonically related to the synchronous sampling clock.

8. The apparatus of claim 7, wherein, for each bit of the random number, the combinatorial logic is configured to generate multiple initial values, each initial value generated using signals from a different subset of oscillators.

9. An apparatus comprising:
multiple oscillators, each oscillator comprising an inverter chain; and
combinatorial logic configured to generate a random number comprising one or more bits, the combinatorial logic configured to generate each bit by combining two or more signals from at least two oscillators that have inverter chains with different prime numbers of inverters;
wherein the combinatorial logic comprises one or more bit lanes, each bit lane comprising:
an XOR gate configured to combine the two or more signals and generate an initial value;
a digital latch configured to sample the initial value; and
a toggle-type flip-flop configured to receive an output of the digital latch.

10. The apparatus of claim 9, wherein:
each bit lane comprises multiple XOR gates, multiple digital latches, and multiple toggle-type flip-flops; and
each bit lane further comprises (i) an additional XOR gate configured to receive outputs of the toggle-type flip-flops and (ii) an additional digital latch configured to receive an output of the additional XOR gate.

11. An apparatus comprising:
multiple oscillators, each oscillator comprising an inverter chain; and
combinatorial logic configured to generate a random number comprising one or more bits, the combinatorial logic configured to generate each bit by combining two or more signals from at least two oscillators that have inverter chains with different prime numbers of inverters;
wherein:
each of at least one of the oscillators comprises multiple taps configured to provide multiple signals from that oscillator; and
the multiple signals from one of the oscillators have different asynchronous phases relative to a synchronous sampling clock used by the combinatorial logic.

12. The apparatus of claim 11, wherein:
the random number comprises multiple bits; and
the combinatorial logic is configured to use the signal from each tap of each oscillator at most only once in generating the multiple bits.

13. A system comprising:
a random number generator comprising:
multiple oscillators, each oscillator comprising an inverter chain; and
combinatorial logic configured to generate a random number comprising one or more bits, the combinatorial logic configured to generate each bit by combining two or more signals from at least two oscillators that have inverter chains with different prime numbers of inverters; and
a processing device configured to receive the random number;
wherein:
each of at least one of the oscillators comprises multiple taps configured to provide multiple signals from that oscillator; and
the multiple signals from one of the oscillators have different asynchronous phases relative to a synchronous sampling clock used by the combinatorial logic.

14. The system of claim 13, wherein the combinatorial logic is configured to generate each bit using signals from a unique combination of oscillators.

15. A system comprising:
a random number generator comprising:
multiple oscillators, each oscillator comprising an inverter chain; and
combinatorial logic configured to generate a random number comprising one or more bits, the combinatorial logic configured to generate each bit by combining two or more signals from at least two oscillators that have inverter chains with different prime numbers of inverters; and
a processing device configured to receive the random number;
wherein, for each bit of the random number, the combinatorial logic is configured to generate multiple initial values, each initial value generated using signals from a different subset of oscillators.

16. The system of claim 15, wherein each subset of oscillators consists of oscillators with inverter chains having different numbers of inverters.

17. The system of claim 15, wherein, for each bit of the random number, the combinatorial logic is further configured to:
sample the initial values to generate sampled values;
toggle multiple data bits using the sampled values; and
combine the multiple data bits.

18. The system of claim 15, wherein:
each of at least one of the oscillators comprises multiple taps configured to provide multiple signals from that oscillator; and
the multiple signals from one of the oscillators have different asynchronous phases relative to a synchronous sampling clock used by the combinatorial logic.

19. A method comprising:
receiving multiple signals from multiple oscillators, each oscillator comprising an inverter chain; and
generating a random number comprising one or more bits, wherein each bit of the random number is generated by combining two or more signals from at least two oscillators that have inverter chains with different prime numbers of inverters;
wherein, for each bit of the random number, generating the random number comprises generating multiple initial values, each initial value generated using signals from a different subset of oscillators.

20. The method of claim 19, wherein, for each bit of the random number, generating the random number further comprises:
sampling the initial values to generate sampled values;
toggling multiple data bits using the sampled values; and
combining the multiple data bits.

21. The method of claim 19, wherein each subset of oscillators consists of oscillators with inverter chains having different numbers of inverters.

22. A method comprising:
receiving multiple signals from multiple oscillators, each oscillator comprising an inverter chain; and
generating a random number comprising one or more bits, wherein each bit of the random number is generated by combining two or more signals from at least two oscillators that have inverter chains with different prime numbers of inverters;
wherein:
receiving the multiple signals comprises receiving signals from multiple taps in each of at least one of the oscillators; and
the signals from the multiple taps in one of the oscillators have different asynchronous phases relative to a synchronous sampling clock used to generate the random number.

23. The method of claim 22, wherein, for each bit of the random number, generating the random number comprises generating multiple initial values, each initial value generated using signals from a different subset of oscillators.

* * * * *